(12) United States Patent
Reuben

(10) Patent No.: US 10,390,637 B2
(45) Date of Patent: *Aug. 27, 2019

(54) METHOD OF FABRICATING A THERMALLY INSULATING STRETCHABLE DOWN FEATHER SHEET AND THE PRODUCT THEREFROM

(71) Applicant: Ronle Reuben, Town of Mount Royal (CA)

(72) Inventor: Ronle Reuben, Town of Mount Royal (CA)

( * ) Notice: Subject to any disclaimer, the term of this patent is extended or adjusted under 35 U.S.C. 154(b) by 519 days.

This patent is subject to a terminal disclaimer.

(21) Appl. No.: 14/999,493

(22) Filed: May 16, 2016

(65) Prior Publication Data

US 2016/0262556 A1 Sep. 15, 2016

Related U.S. Application Data

(63) Continuation-in-part of application No. 13/999,094, filed on Jan. 13, 2014, now Pat. No. 9,380,893.

(51) Int. Cl.
*B32B 9/04* (2006.01)
*A47G 9/02* (2006.01)
(Continued)

(52) U.S. Cl.
CPC .............. *A47G 9/0223* (2013.01); *B32B 1/00* (2013.01); *B32B 5/022* (2013.01); *B32B 5/024* (2013.01); *B32B 5/028* (2013.01); *B32B 5/04* (2013.01); *B32B 5/06* (2013.01); *B32B 5/26* (2013.01); *B32B 7/08* (2013.01); *B32B 9/02* (2013.01); *B32B 9/047* (2013.01); *B32B 37/24* (2013.01); *B60R 13/0815* (2013.01); *D04H 1/02* (2013.01); *D04H 1/541* (2013.01); *D04H 1/60* (2013.01); *D04H 1/732* (2013.01); *B32B 37/20* (2013.01); *B32B 2037/243* (2013.01); *B32B 2262/023* (2013.01); *B32B 2262/0215* (2013.01);
(Continued)

(58) Field of Classification Search
CPC ............... D06M 9/00; Y10S 5/95; B68G 3/08
See application file for complete search history.

(56) References Cited

U.S. PATENT DOCUMENTS 5,624,729 A * 4/1997 Cohen ................... B32B 37/144
428/90
6,232,249 B1 * 5/2001 Kawada ................. A47G 9/007
428/332
(Continued)

*Primary Examiner* — Mark Ruthkosky
*Assistant Examiner* — Julia L Rummel
(74) *Attorney, Agent, or Firm* — Guy J. Houle; Houle Patent Agency Inc.

(57) ABSTRACT

A method of fabricating a thermally insulating stretchable down feather sheet is described. The core of the sheet is comprised of down mixed with a binder mixture which exhibits elastic properties. The binder mixture consists of heat fusible stretchable glue particles and heat fusible elastomeric binding strands in dry form. The core is sandwiched between a bottom and a top stretchable elastomeric sheet having multi-directional stretchability. The core of down and the binder as well as the elastomeric sheet are bound together by heat treatment to provide a down insulating sheet which is stretchable in all directions without fractioning the sheet and which is capable of recovering substantially its original relaxed form after stretching or deformation.

9 Claims, 2 Drawing Sheets

(51) Int. Cl.
*B32B 5/02* (2006.01)
*B32B 5/04* (2006.01)
*B32B 7/08* (2019.01)
*B32B 9/02* (2006.01)
*B32B 37/24* (2006.01)
*B32B 1/00* (2006.01)
*B60R 13/08* (2006.01)
*D04H 1/02* (2006.01)
*D04H 1/541* (2012.01)
*D04H 1/60* (2006.01)
*D04H 1/732* (2012.01)
*B32B 5/06* (2006.01)
*B32B 5/26* (2006.01)
*B32B 37/20* (2006.01)

(52) U.S. Cl.
CPC ... *B32B 2262/0276* (2013.01); *B32B 2262/08* (2013.01); *B32B 2262/14* (2013.01); *B32B 2264/0214* (2013.01); *B32B 2264/12* (2013.01); *B32B 2305/18* (2013.01); *B32B 2307/304* (2013.01); *B32B 2307/51* (2013.01); *B32B 2307/724* (2013.01); *B32B 2317/00* (2013.01); *B32B 2317/10* (2013.01); *B32B 2437/00* (2013.01); *B32B 2605/00* (2013.01); *B32B 2605/003* (2013.01); *Y10S 5/95* (2013.01)

(56) References Cited

U.S. PATENT DOCUMENTS

| | | | |
|---|---|---|---|
| 9,380,893 B2* | 7/2016 | Reuben | B60R 13/0815 |
| 2004/0097158 A1* | 5/2004 | Rudisill | D01F 8/14 |
| | | | 442/401 |
| 2004/0099984 A1* | 5/2004 | Chang | D01F 8/14 |
| | | | 264/172.14 |
| 2004/0126580 A1* | 7/2004 | Gaignard | D04H 1/02 |
| | | | 428/373 |
| 2012/0328887 A1* | 12/2012 | Ryan | B27N 3/06 |
| | | | 428/446 |

* cited by examiner

METHOD OF FABRICATING A THERMALLY INSULATING STRETCHABLE DOWN FEATHER SHEET AND THE PRODUCT THEREFROM

CROSS-REFERENCE

The is a continuation-in-part of application Ser. No. 13/999,094, filed on Jan. 13, 2014 and relating to a thermally insulating stretchable down feather sheet and method of fabrication.

TECHNICAL FIELD

The present invention relates to a method of fabricating a thermally insulating down feather sheet and particularly to one that has multi-directional stretchability.

BACKGROUND ART

In my U.S. Pat. No. 6,025,041 I describe a first generation down feather sheet and wherein the down feathers are retained in a homogeneous form by a chemical binder agent or rigid fibers and further wherein the down feathers are exposed on all sides of the sheet. A primary purpose of that down feather sheet was to provide a sheet of down feathers for use by the apparel fabricating industry as superior insulation in garments. Such a down feather sheet provided a substantially constant distribution of the down feathers and thus prevented the development of cold spots in the insulation. Because the down feathers are exposed in all outer surfaces of the down feather sheet extra care was necessary to prevent the down feathers from detaching from the faces of the sheet or patterns cut from the sheet.

There is a need to develop a down feather sheet for use in many other applications to provide improved thermal insulation, such as in the construction of vehicles where the passenger enclosure which is climatically controlled during hot or cold weather condition needs to be well insulated. Countless other applications exist as one can imagine. However, for such commercial use, as well as in the fabrication of articles of apparel, there is a need to retain the down feathers captive in the sheets or patterns and to make down feather sheet stretchable (elastic) whereby it can be stretched during installation or use when the need arises to do so.

Another problem with down insulating products, such as articles of apparel is that when such articles are washed in a washing machine, the down has a tendency to form clumps and the minute down clusters can come out of the lining fabric. Ideally, such products should be dry cleaned but still the down clusters, being very small and unstable, can be drawn out of the lining fabric. Such affects the insulating quality and the aesthetic appearance of the garment.

More recently, such down feather sheets have been held captive between sheets of non-woven fabrics adhered to opposed top and bottom surfaces of the sheets and held thereto by a glue binder present at the interface with the down sheet. Although, that solution did prevent some escapement of the down feathers, it did not provide for the use of such material in other industrial manufacturing applications as the material, although flexible did not provide for stretching of the sheet to attach it to flexible and rigid shaped objects and in restricted spaces where it is necessary for the sheet to stretch. Also, when used in garments in areas where movement is required such as in underarm areas or knee areas of clothing, rigid down insulating sheets when stretched would tear to form clumps of insulation which would gather in specific areas and become visible to the eye and form cold spots in the garment. Therefore, that improvement did not overcome these existing problems to extend the use of such down feather sheets.

SUMMARY OF THE INVENTION

It is a feature of the present invention is to provide a method of fabricating a thermally insulating stretchable down sheet having the above mentioned features and capable of fulfilling the above mentioned needs.

Another feature of the present invention is to provide a method of fabricating a thermally insulating stretchable down sheet comprised of a mixture of down with elastic binding filaments and elastic glue, in predetermined proportions, to achieve a desired characteristic and to retain the mixture captive between opposed sheets of stretchable material having multi-directional stretchability.

It is a further feature of the present invention to provide a down sheet in a form which is breathable, soft, lightweight, and stretchable while substantially preventing the escape of down clusters from the opposed surfaces of the down sheet.

Another feature of the present invention is to provide a down sheet wherein the down clusters are held together by a binder exhibiting elastic properties and wherein at least one stretchable elastomeric sheet having multi-directional stretching is bound to an outer one of a top or bottom surface of the down sheet.

Another feature of the present invention is to provide a down sheet formed from down clusters bound together by elastic glue/polymer elastic filaments which also bind the outer elastomeric sheets.

According to the above features, from a broad aspect of the present invention, there is provided a method of fabricating a thermally insulating stretchable down sheet which comprises the steps of mixing, in a mixing chamber, a predetermined volume of down with a predetermined volume of a dry binder comprised of a mixture of binding strands and glue particles exhibiting binding and elastic properties when subjected to a thermal treatment to form a stretchable insulating core. A sheet of stretchable material having multi-directional stretchability capable of stretching in all directions is displaced under a depositing outlet of the mixing chamber where a substantially uniform layer of the down mixed with the dry binder is deposited on a top surface of the sheet of stretchable material. The stretchable elastomeric sheet with the substantially uniform layer of the down mixed with the binder, is then conveyed to a thermal chamber to be subjected to a thermal treatment to trap and bond the down feathers and the binder together and to the sheet of stretchable material to form the thermally insulating stretchable down feather sheet which is then conveyed out of the thermal chamber as a continuous bonded stretchable down feather sheet.

According to another broad aspect, the present invention provides a thermally insulating stretchable down sheet comprised of a mixture of down and a binder formed by heat fusible elastomeric binding strands exhibiting elastic properties and mixed together with the down in a proportion of from about 10% to 25% by weight of said elastomeric binding strands to form a stretchable down core. A stretchable elastomeric sheet having multi-directional stretchability is bound to an upper and a lower surface of the down core.

According to another broad aspect, the present invention provides a thermally insulating stretchable down sheet comprised of a mixture of down and a binder formed by heat fusible glue particles exhibiting elastic properties and mixed together with the down in a proportion of from about 6% to 15% by weight of the glue particles to form a stretchable down core. A stretchable elastomeric sheet having multi-directional stretchability is bound to an upper and a lower surface of the down core.

DESCRIPTION OF THE DRAWINGS

A preferred embodiment of the present invention will now be described with reference to the accompanying drawings, in which:

FIG. 4 is an enlarged and partly fragmented section view illustrating an application of the thermally insulating stretchable down sheet and wherein the sheet is stretched and secured to an irregular shaped member.

DETAILED DESCRIPTION OF THE PREFERRED EMBODIMENTS

Figure 1:
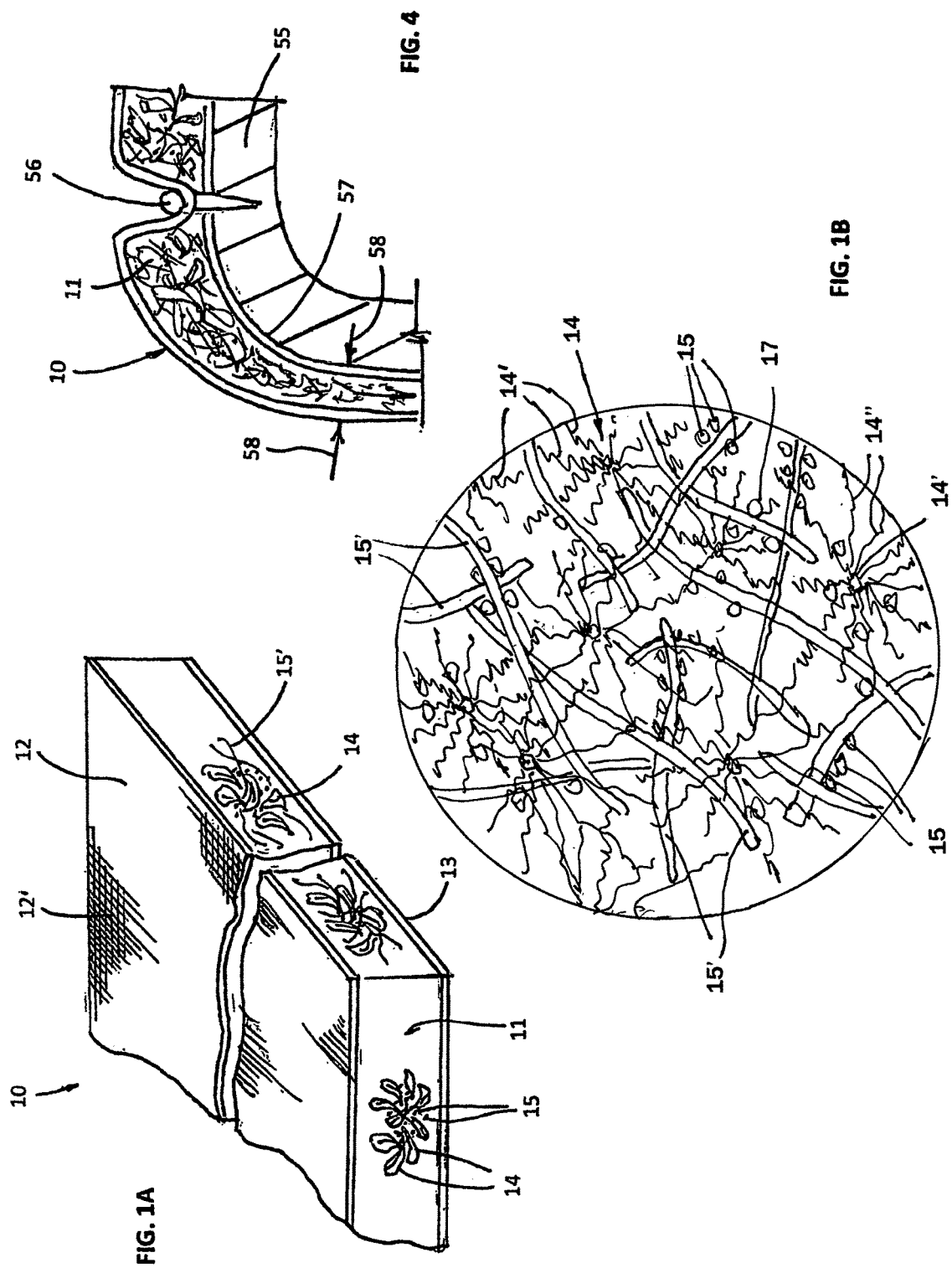
FIG. 1A is a fragmented perspective view of a thermally insulating stretchable down sheet constructed in accordance with the present invention and illustrating two types of elastomeric outer sheets and different types of binding techniques.
FIG. 1B is an enlarged view of a section of the down core and wherein the down cluster are trapped and bound together by heat-fused glue particles and elastomeric binding strands and the down tentacles of the clusters to form a stretchable down core.

Referring now to the drawings, and particularly to FIG. 1A, there is shown at 10 a thermally insulating stretchable down sheet constructed in accordance with the present invention. It is comprised of a stretchable down core 11 sandwiched between and bonded to a top and a bottom multi-directional stretchable elastomeric sheet 12 and 13, respectively, made from woven or non-woven fibers. The core 11 is comprised of down clusters 14 mixed with a stretchable binder 15, in predetermined proportions. The binder 15 is a mixture of an elastic glue and stretchable polyester fibers capable of bonding when heat treated whereby to form a homogeneous thermally insulating down core which exhibits elastic properties permitting it to stretch with the elastomeric sheets with no or minimal fracture to the core.

The expression "elastomeric" as used herein is meant to have the meaning of elastic or stretchable wherein the core formed of down and the elastic binder is capable of recovering substantially its original relaxed form after stretching or deformation. Also, the elastomeric sheets may be woven or non-woven in the form of films, nettings, and the like, and are basically isotropic, exhibiting essentially the same properties in all directions of their two dimensional plane. Such elastomeric goods as utilized with the present invention are for example polyurethane resins which are capable of fusing when subjected to heating whereby to bond. Some elastic polymer filaments 15' are formed from styrene strands and some may exhibit an elongation to break of at least 200%, and when released from stretching retreats to about 125% of its original length. Many of such fibers or filaments and nonwovens are currently available in the trade. Webs made thereof provide excellent stretchable characteristics, breathability, softness, lightweight and weathering resistance.

The elastomeric, multi-directional, stretchable sheets 12 and 13 may also be in the form of netting, as mentioned above and as denoted by reference numeral 12' in FIG. 1A and comprised of polymer filaments produced by extrusion streams to form a regular array of weft and warp stretchable filaments bonded together at their crossings to produce a net which exhibits multi-directional stretching. For example, such netting may be fabricated from Nylon 6 and polypropylene. These nettings are all known in the art and for example disclosed in U.S. Pat. No. 4,636,419, the disclosure of which is herein incorporated by reference. U.S. Pat. No. 4,241,123 also discloses a non-woven netting formed by a first group of melting monofilaments and a second group of monofilaments or a yarn which is crossed, pressed and heat welded to form a fiber stand netting capable of softening under heat treatment to bond to the core 11 and has the capability to stretch in all directions.

FIG. 1B is an enlarged view illustrating the mixture of the down clusters 14 with a binder which is constituted by a mixture of the elastic glue particles 15 and the elastic polymer strands or filaments 15'. Each cluster 14 has a central quill point 14' with fluffy tentacles or filaments 14" projecting from its central quill point 14' in all directions creating a three dimensional structure which traps air to give down insulating ability. The clusters attach to one another by their tentacles 14" when plucked from the goose, duck or swan. As can be seen such as identified by reference numeral 17, some of the glue particles 15 that are melted bind to both the down clusters 14 and the elastic polymer filaments 15' and thus provide improved bonding of the elements in the mixture and entrapment of the down clusters preventing the down clusters from escaping from the side edges of the sheet 10. The filaments 15' or fibers act as carriers for the glue particles. As also denoted by reference numeral 18, the filaments 15' bind to themselves at their crossings and to the down tentacles 14'. Also, the tentacles 14' have a twisted shape and interconnect with the tentacles of adjacent clusters. The interconnections of the filaments, the stretchable glue and the tentacles of the down with one another form a homogeneous stretchable core sandwiched between the opposed multi-directional stretchable elastomeric sheets 12 and 13.

Figures 2, 3:
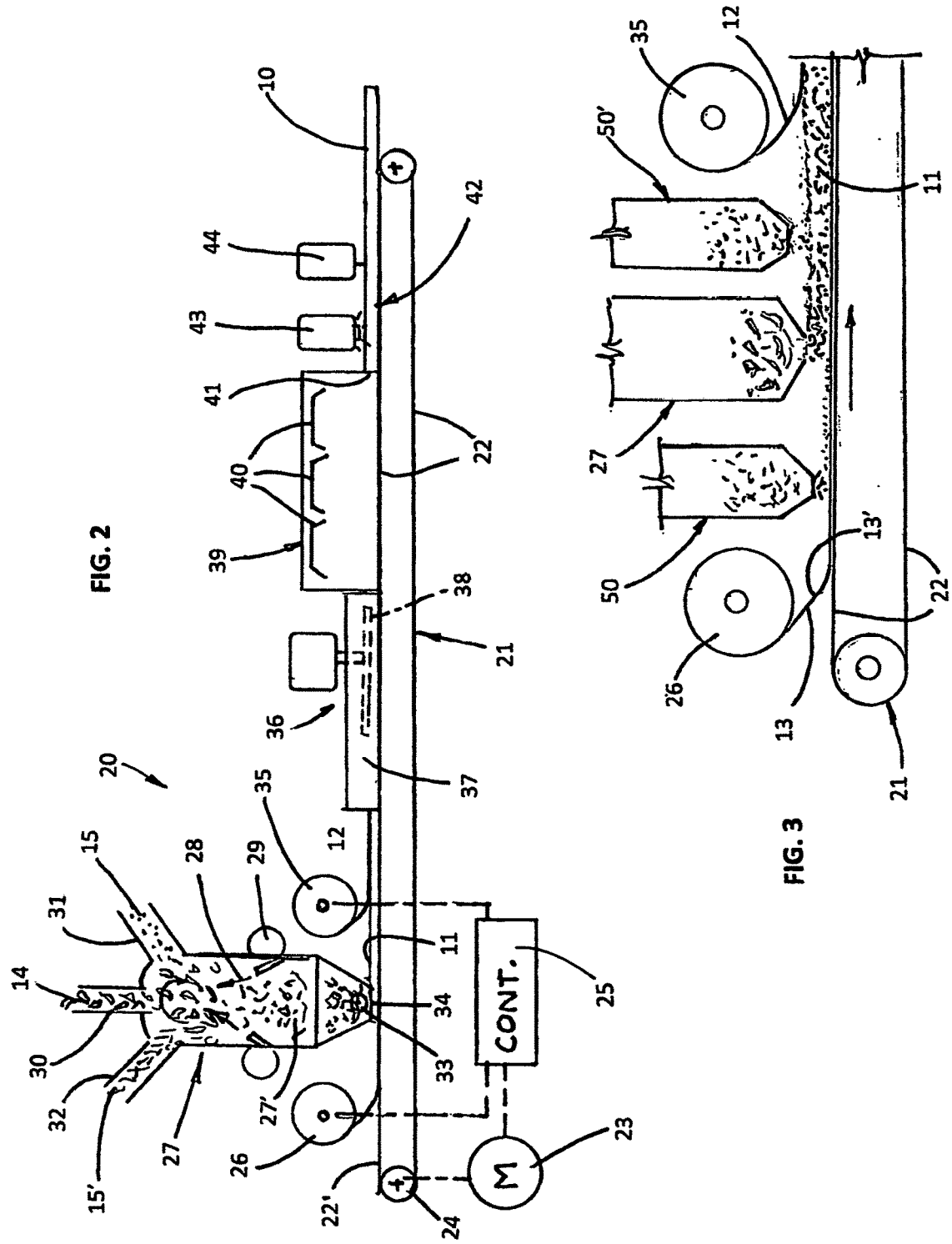
FIG. 2 is a schematic illustration showing the method of fabricating the thermally insulating stretchable down sheet using a binder having multi-directional elastic properties when heat fused and mixed with the down and held captive between opposed elastomeric sheets having multi-directional stretchability.
FIG. 3 is a schematic illustration showing a modification of FIG. 2 wherein a coating of a tackifier binder is applied between the down core and the outer elastomeric multi-directional stretchable sheets.

With reference now to FIG. 2 there will be described the method of fabricating the thermally insulating stretchable down sheet 10 of the present invention. As herein shown, the machine 20 comprises a conveyor 21 having an endless belt 22 fabricated from a non-stick material and capable of withstanding heat up to at least 150 degrees C. The belt 22 extends through the machine length, as herein shown, although the conveyor may be constituted by two or more driven and aligned conveyor belt sections driven synchronized to one another. The belt is driven by a motor 23 coupled to a drive drum or sprocket 24, the speed of which is controlled by a controller device 25 whereby to control the thickness or density of the down core 11 deposited on the belt. The different operating parameters of the machine are programmed in the controller device and can be adjusted on the controller device or remote therefrom.

At the inlet end of the conveyor 21 there is supported a roll 26 containing a supply of the stretchable elastomeric sheet 13 which is dispensed on the top surface 22' of the conveyor belt at a speed synchronized with the speed of the conveyor belt 22. An air mixing chamber 27 is supported above the top run 22' of the conveyor and is preferably, although not exclusively, constructed of clear plastic whereby to view the operation therein of the air turbulence mixing action of the down feathers 14 with the binder glue particles and/or the stretchable fibers 15'. Air mixing currents 28 are injected at an upward angle inside the mixing chamber 27 by blowers 29, the air speed of which may be regulated by the controller settings. The down clusters 14 are fed into the mixing chamber 27 at a control rate via a feed chute 30. The dry elastic glue particles 15 and/or elastic filaments 15' are also fed to the mixing chamber 27 via a chute 31, there being from about 2% to 30% of filaments by weight of the mixture. The elastic glue particles are released in volume to comprise 2% to 30% by weight of the mixture with the down and preferably 6% to 15% by weight. Likewise, when the binder is a stretchable elastic filament 15', it is fed to the mixing chamber 27 via a separate chute 32. The stretchable elastic filaments may comprise 5% to 80% by weight of the mixture with the down to form a mostly polyester insulating sheet with reduced thermal insulating properties. Preferably, the down mixture is from about 10% to 25% by weight to form the down insulating sheet of the invention. The binder is preferably constituted by a blend of the elastic glue particles 15 and the stretchable or elastic filaments 15' in equal proportions or 30% filaments and 70% glue particles or variations thereof depending on the desired elastic properties. As an example, a 30 grams down insulating sheet 10 contains between 3 grams to 7.5 grams of the glue and filaments mixture, whereas a 100 grams down insulating sheet may contain 10 grams to 25 grams of the glue and filaments mixture. It is contemplated that to the mixture there may also be added other components in the form of chemical additives of fibers to provide fire retardants or to improve the tensile strength of the core.

The elastic glue binder as herein contemplated has a softening binding point above 80 degrees C. while the elastic filaments which are low molecular weight polymers may have a softening point slightly below 80 degrees C. As the down and binder mix in the upper part of the mixing chamber, the mixture starts to precipitate downwards to the lower part 27' of the chamber where a dispensing rotor 33 is rotated to dispense the mixture through a bottom depositing outlet 34 of the mixing chamber 27 at a constant volume onto elastomeric sheet 13. By controlling the speed of the conveyor belt, the thickness of the deposited mixture is controlled and this is accomplished by the conveyor speed setting in the controller 25.

Downstream of the mixing chamber there is supported a second roll 35 containing a supply of the multi-directional stretchable elastomeric sheet 12 which is applied on the top surface of the down core sheet 11 exiting its passage from under the mixing chamber 27. Optionally, a down core sheet restrainer device 36 may be supported across the conveyor belt 22 to restrain the down and bi-component stretchable mixture on opposed sides thereof by adjustable guide side walls 37 supported above and close to the top surface of the conveyor belt 22 to prevent the down mixture from escaping from the side edges thereof. The elastomeric stretchable sheet 12 restrains the top surface of the down mixture. Additionally, a top compression plate 38 may span across the conveyor belt above the down mixture to gradually compress the mixture if desired prior to entry into a thermal chamber 39. If it is desired to support the down and the binder mixture on the bottom elastomeric sheet only, then the second roll 35 of the elastomeric sheet is not necessary. However, to retain the down mixture in place the top compression plate 38 would act as a covering over the top surface of the down mixture with the binder. The down clusters are very unstable and are easily releasable into the air when not constrained. This is why the second roll 35 is positioned close to the outlet 34 in order to restrain the down as soon as possible after being deposited on the elastomeric sheet.

The thermal chamber 39 is of a predetermined length and provided with heating devices 40 capable of generating controlled heat in the thermal chamber in the range of from about 80 degrees C. to 160 degrees C. to melt the elastic glue 15 mixed with the elastic filaments 15'. At the outlet 41 of the thermal chamber exits the thermally insulating stretchable down sheet 10 of the present invention and it may be conveyed along a cooling end section 42 of the conveyor 21 to cool the sheet 10. Alternatively, cooling air blowers 43 may be mounted above the exit end section 42 of the conveyor to provide for rapid cooling of the sheet 10. A suitable slitter device 44 can then sever the sheet into sections to form individual sheets or slit the sheet to provide the end of a roll of the down sheet.

Referring now to FIG. 3 there is illustrated a further modification of the machine 20. As herein shown a tackifier or plasticizer applicator 50 and 50' may be positioned adjacent the entry end and exit end respectively of the mixing chamber 27 whereby to release a small quantity of a tackifier on the top surface 13' of the stretchable elastomeric sheet 13 and the top surface of the down mixture for the addition of stretchable adhesive. The tackifier may be constituted by the elastic glue particles or the elastomeric binding filaments or a combination thereof whereby to enhance the binding at the interfaces of the multi-directional stretchable elastomeric sheets 12 and 13 with the down feather core 11. This is particularly useful if the elastomeric sheets are constituted by netting which improves breathability and wherein the added tackifier further prevents the down clusters from being released through the interstices of the netting.

As shown in FIG. 4, because the thermally insulated down sheet 10 of the present invention has multi-directional stretchability it can be used in numerous insulating applications. As herein shown, the sheet is secured to a rigid curved body 55 by fasteners, one fastener 56 herein illustrated, and is stretched in a curved area 57 of the body 55 where the sheet 10 is stretched thereby stretching and compressing the core material 11 in the zone identified by arrows 58 and without fracturing the sheet due to its stretchability. Similarly, when the sheet 10 is sown in articles of apparel the same stretching occurs in certain areas of the apparel where there is movement stretching the insulation such as in arm pit areas of jackets, etc., and knee areas of the legs of insulating pants, such as ski pants, etc. The breathability of the insulating stretchable down feather sheet 10 also provides for the passage of humidity and air flow when positioned in vent areas of certain articles of apparel or any area where such breathable feature is required. The thermally insulating stretchable down sheet can be secured to various elements by many types of securement means, such as glue, stitching, heat bonding, etc.

The above description of the preferred embodiment is intended to cover equivalents of the specific examples described provided such equivalents fall within the scope of the appended claims.

The invention claimed is:

1. A thermally insulating stretchable down sheet comprising a core consisting of a mixture of down and a binder mixture exhibiting elastic properties, said binder consisting of heat-fused stretchable glue particles and heat-fused elastomeric binding strands mixed with said down in proportions of 2% to 30% by weight of said stretchable glue and 2% to 30% by weight of said elastomeric binding strands, a first and a second sheet of stretchable material having multi-directional stretchability capable of stretching in all directions bound respectively to an upper and a lower surface of said core, said core and said sheets of stretchable material having shape-recovery properties wherein said thermally insulating stretchable sheet is capable of recovering substantially its original relaxed form after stretching or deformation.

2. The thermally insulating stretchable down sheet as claimed in claim 1 wherein each of said sheets of stretchable material is an elastomeric sheet.

3. The thermally insulating stretchable down sheet as claimed in claim 1 wherein said core is made by combining 6% to 15% by weight of dry heat-fusible stretchable glue particles with down.

4. The thermally insulating stretchable down sheet as claimed in claim 1 wherein said core is made by combining 10% to 25% by volume of said elastomeric binding strands with down.

5. The thermally insulating stretchable down sheet as claimed in claim 1 wherein said core is made by combining 6% to 80% by weight of said binder mixture to form said thermally insulating stretchable down sheet having a wide range of desired insulating properties and composition.

6. The thermally insulating stretchable down sheet as claimed in claim 1 wherein said elastomeric strands are styrene strands or blends thereof and having a softening point below 80 degrees C., said heat-fusible glue particles also having a softening point of about 80 degrees C.

7. A thermally insulating stretchable down sheet comprising:
    a core consisting of a mixture of down, chemical additive fibers, and a binder exhibiting elastic properties, said chemical additive fibers consisting of fire-retardant fibers or tensile strength-improving fibers and said binder consisting of heat-fused stretchable glue particles and heat-fused stretchable elastic filaments;
    wherein said down, chemical additive fibers, and binder glue particles and stretchable filaments are mixed together in predetermined proportions, said proportion of stretchable elastic filaments in the range of 5% to 80% by weight and said proportion of down in the range of about 10% to 25% by weight of said mixture, to form a thermally insulating sheet;
    and a sheet of stretchable material having multi-directional stretchability capable of stretching in all directions bound to one of an upper and a lower surface of said core;
    wherein said core and said sheet of stretchable material have shape-recovery properties such that said thermally insulating stretchable sheet is capable of recovering substantially its original relaxed form after stretching or deformation.

8. The thermally insulating stretchable down sheet as claimed in claim 7 wherein there is said sheet of stretchable material bound to opposed ones of said upper and lower surface of said core.

9. The thermally insulating stretchable down sheet as claimed in claim 7 wherein said stretchable elastic filaments are polystyrene strands or blends thereof and having a softening point below 80 degrees C.

* * * * *